United States Patent
Camps

(10) Patent No.: US 9,016,335 B2
(45) Date of Patent: Apr. 28, 2015

(54) DEBRIS GUARD CONNECTED TO A BOOM

(75) Inventor: Ryan D. Camps, Dubuque, IA (US)

(73) Assignee: Deere & Company, Moline, IL (US)

( * ) Notice: Subject to any disclaimer, the term of this patent is extended or adjusted under 35 U.S.C. 154(b) by 1001 days.

(21) Appl. No.: 13/150,914

(22) Filed: Jun. 1, 2011

(65) Prior Publication Data

US 2012/0305136 A1 Dec. 6, 2012

(51) Int. Cl.
*A01G 23/08* (2006.01)
*A01G 23/081* (2006.01)
*A01G 23/091* (2006.01)

(52) U.S. Cl.
CPC .............. *A01G 23/081* (2013.01); *A01G 23/08* (2013.01); *A01G 23/091* (2013.01)

(58) Field of Classification Search
CPC ... A01G 23/08; A01G 23/083; A01G 23/091; A01G 23/093; A01G 23/081; B02C 21/02; A01D 42/005
USPC ............. 144/4.1, 34.1, 2.1, 3.1, 251.1, 251.2, 144/251.3; 241/101.5, 101.71–101.74, 241/0.741, 0.75
See application file for complete search history.

(56) References Cited

U.S. PATENT DOCUMENTS

| 4,265,063 | A | * | 5/1981 | Muller | 52/115 |
| 4,291,734 | A | * | 9/1981 | Hammond | 144/24.13 |
| 4,411,070 | A | * | 10/1983 | Boyum et al. | 30/379.5 |
| 4,813,737 | A | * | 3/1989 | Schlapp | 296/214 |
| 5,003,759 | A | * | 4/1991 | Brown | 56/249 |
| 5,419,380 | A | * | 5/1995 | Bot | 144/334 |
| 5,743,315 | A | * | 4/1998 | Esposito et al. | 144/334 |
| 6,311,796 | B1 | * | 11/2001 | Mayer | 180/69.2 |
| 7,377,412 | B2 | * | 5/2008 | Grinsted | 226/172 |

* cited by examiner

*Primary Examiner* — Shelley Self
*Assistant Examiner* — Onekki Jolly

(57) ABSTRACT

A forestry vehicle including a frame, a pivoting boom, a first structure, a second structure, and a debris guard. The pivoting boom is carried by the frame. The first structure is carried by the frame and is positioned on a first side of the pivoting boom. The second structure is also carried by the frame and is positioned on a second side of the pivoting boom. A channel exists between the first structure and the second structure. The pivoting boom travels in the channel as the boom pivots about its pivotal axis. The debris guard is pivotally and slidingly coupled to the boom.

18 Claims, 4 Drawing Sheets

DEBRIS GUARD CONNECTED TO A BOOM

FIELD OF THE INVENTION

The present invention relates to forestry machinery, and, more particularly, to a debris guard for a boom on forestry machinery.

BACKGROUND OF THE INVENTION

Forestry machines in the form of feller/bunchers have a saw head on the front end of the machine with a spinning disk at the bottom of the saw head. A plurality of cutting teeth are mounted to the periphery of the spinning disk at spaced apart intervals, which serves as a saw blade for the cutting of trees. A feller/buncher has articulated fingers that grasp the trees as they are being cut and are used for the purpose of positioning the trees at a desired location on the ground. This is accomplished by the power and dexterity of the feller/buncher.

The feller/buncher typically has a pivoting boom which operates in a channel between a cab and an engine assembly. The pivoting boom pivots about a single horizontal axis, allowing the boom to move in a prescribed manner relative to the axis about which it pivots. The channel between the cab and the engine assembly is an area in which certain hydraulic and electrical assemblies are located related to the manipulation of the boom. Debris would fall into this channel and, in an attempt to mitigate the problem, a debris guard was developed which was attached to the boom in a pivoting manner. The debris guard pivots relative to the boom and the debris guard slides within the channel between the engine and the cab as the boom moves about its pivoting axis.

A problem with the current debris guards is that, even though they travel with the boom and pivot relative thereto, the fixed location of debris guard causes a vertical gap between the debris guard and the channel depending upon the position of the boom.

What is needed in the art is a feller/buncher with a debris guard that reduces the debris entering into the channel along the sides of the debris guard.

SUMMARY

The invention in one form is directed to a forestry vehicle including a frame, a pivoting boom, a first structure, a second structure, and a debris guard. The pivoting boom is carried by the frame. The first structure is carried by the frame and is positioned on a first side of the pivoting boom. The second structure is also carried by the frame and is positioned on a second side of the pivoting boom. A channel exists between the first structure and the second structure. The pivoting boom travels in the channel as the boom pivots about its pivotal axis. The debris guard is pivotally and slidingly coupled to the boom.

The invention in another form is directed to a debris guard for use with a boom that is pivotally connected to a forestry vehicle, the boom being movable in a channel between the first structure and the second structure of the forestry vehicle. The debris guard including a plate configured to slide along a face of the boom and a flap pivotally coupled to the plate. The flap is configured to substantially cover the channel on one side of the boom.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one embodiment of the invention and such exemplifications are not to be construed as limiting the scope of the invention in any manner.

DETAILED DESCRIPTION

Figure 1:
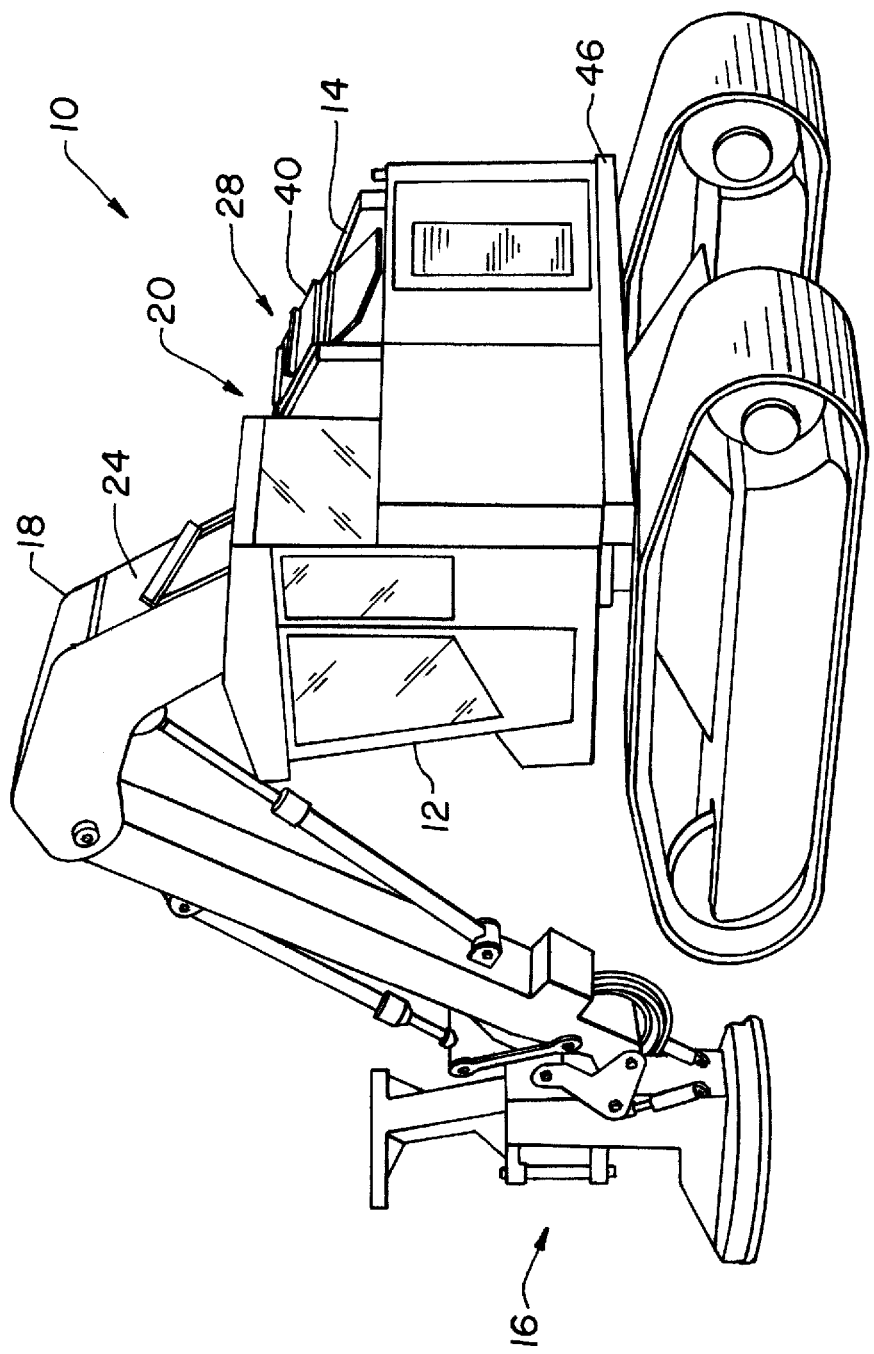
FIG. 1 is a perspective view of a forestry machine including an embodiment of the debris flap of the present invention.

Referring now to the drawings, and more particularly to FIG. 1, there is illustrated a forestry vehicle 10, which may be more commonly known as a feller/buncher configured for the harvesting of trees in the forest. Forestry vehicle 10 includes a first structure 12, and a second structure 14. First structure 12 is in the form of a cab in which an operator sits to drive forestry vehicle 10 and to harvest trees. The second structure 14 may be an engine assembly located on the opposite side of forestry vehicle 10 from first structure 12. Between first structure 12 and second structure 14, there is a channel 20 formed in which pivoting boom 18 moves as it pivots about a horizontal pivoting axis, not illustrated, but understood to be positioned to allow the pivoting of boom 18 within channel 20. A feller/buncher device 16 is connected to an end portion of the boom with another section of the boom being between boom section 18 and feller/buncher device 16. First structure 12 and second structure 14 are supported on a frame 46 that may be pivotally attached to ground engaging tracks or wheels. Pivoting boom 18 is pivotally connected to frame 46.

Figure 2:
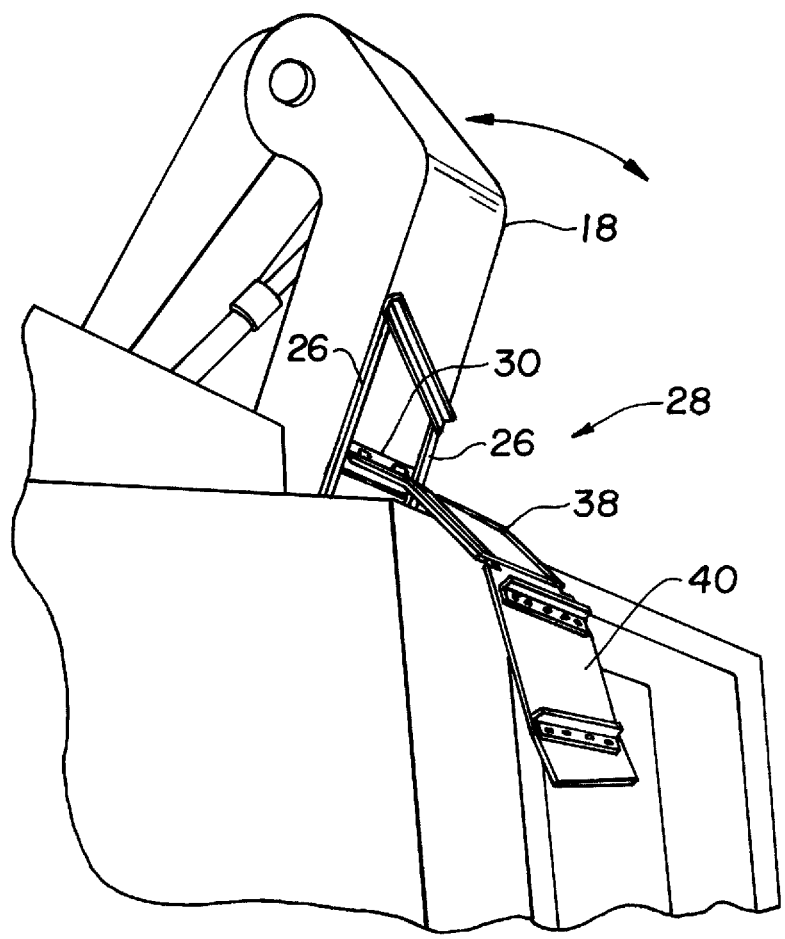
FIG. 2 is another perspective view of a forestry machine of FIG. 1 wherein the boom is in a different position showing the debris guard with the boom predominantly in a retracted position.
Figure 3:
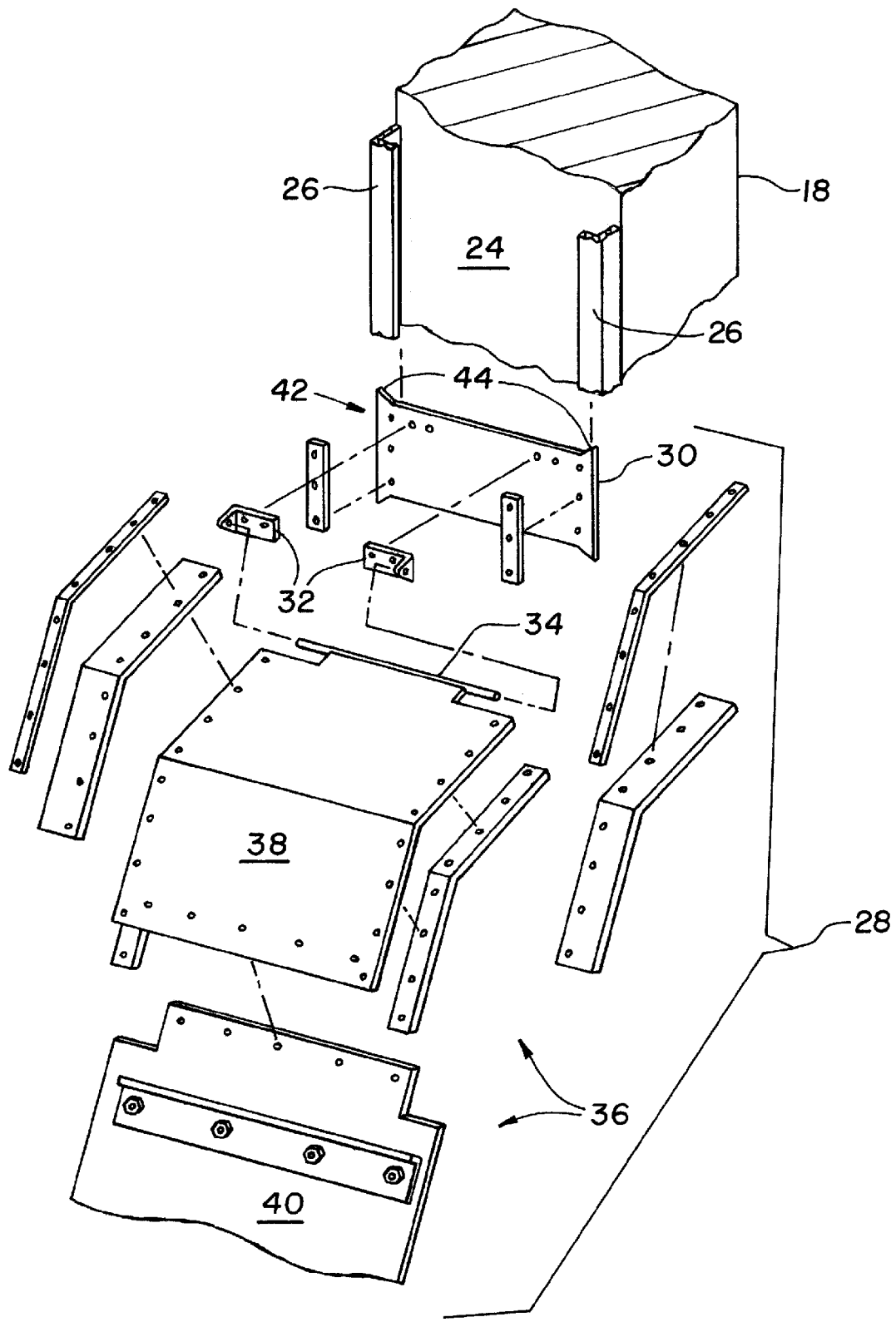
FIG. 3 is an exploded view of the debris guard used on the forestry machine of FIGS. 1 and 2.
Figure 4:
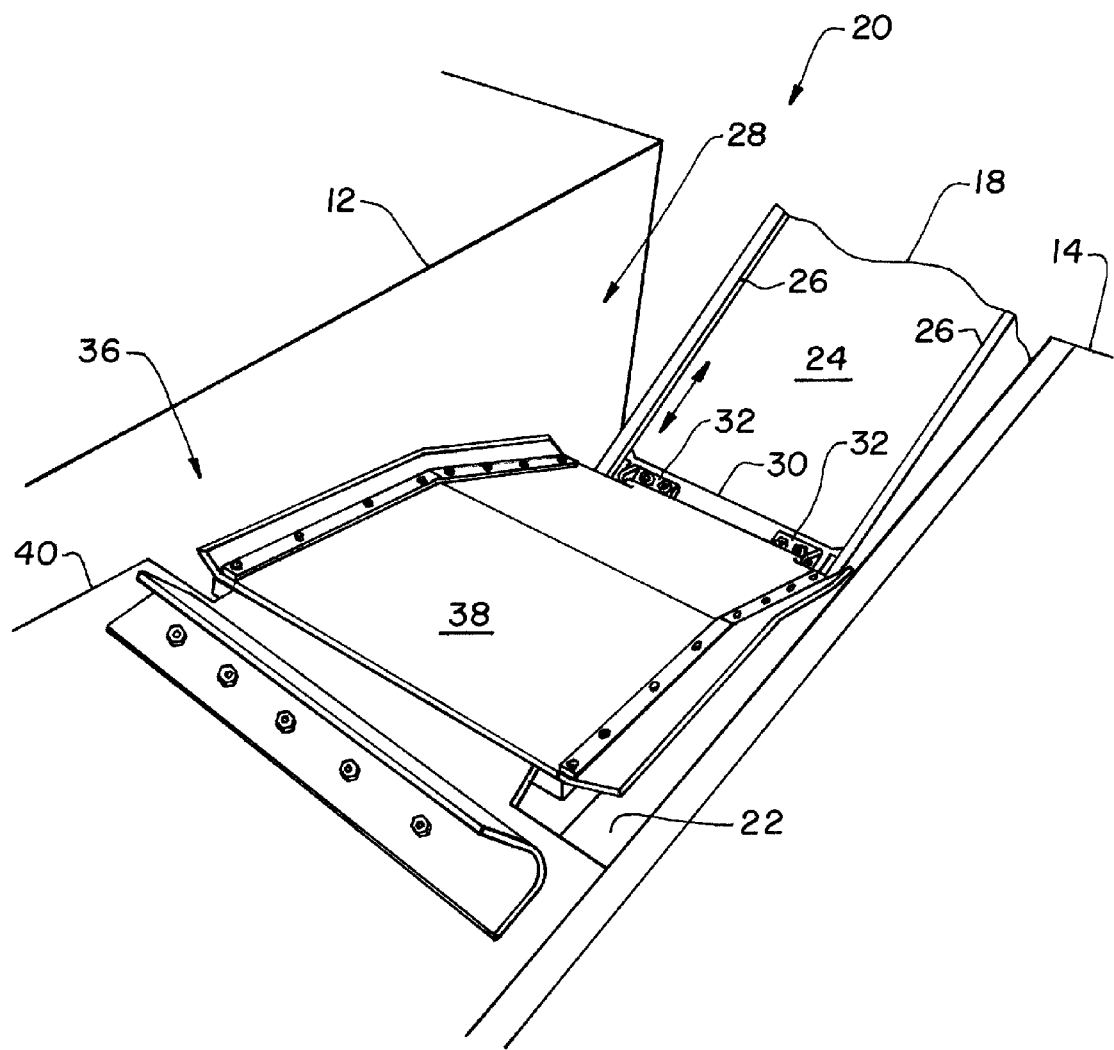
FIG. 4 is another view of the debris guard of FIGS. 1-3 when the boom is in a largely forward or extended position.

Now, additionally referring to FIGS. 2-4, there is illustrated a debris guard 28 that interacts with a portion of boom 18 in a sliding/pivoting manner along a side 24 of pivoting boom 18. Support members 22 extend from a portion of first structure 12 and second structure 14 with only a portion of one support member 22 illustrated in FIG. 4 where a portion of debris guard 28 is lifted up. Support members 22 allow debris guard 28 to slide along as boom 18 pivots therebetween and assist in the deflecting of debris to prevent it from entering into channel 20. J-channels 26 or other channel arrangements extend along a portion of side 24 of pivoting boom 18, allowing a plate 30 of debris guard 28 to slide therein.

Debris guard 28 more specifically includes plate 30, which can be understood to be a structural member, brackets 32, a pivoting member 34, and a flap 36. Flap 36 has a rigid portion 38 and a flexible portion 40. Plate 30 includes connecting features 42 in the form of holes with fasteners being utilized to connect brackets 32 as well as other structural members thereto. Such items may be in the form of bearing surfaces which allow plate 30 to more easily travel in channels 26. Plate 30 additionally has angled edges 44 to serve to remove any debris, ice, or snow that may accumulate within channels 26. Additional bearing surfaces, which may be in the form of high density plastic, may be positioned on plate 30 to reduce sliding friction relative to channels 26 as well as side 24.

Plate 30 is fitted with brackets 32 attached thereto with pivoting member 34 positioned in the holes of brackets 32, prior to the installation of brackets 32 to plate 30. Pivoting member 34 is connected on one end of rigid portion 38 of flap 36, and to the opposite end of rigid portion 38 is attached flexible portion 40. As pivoting boom 18 moves in channel 20, the weight of debris guard 28 causes plate 30 to slide in channels 26 so that the weight of flap 36 is largely resting upon support members 22. As pivoting boom 18 retracts into channel 20, moving in a backward direction, the movement of plate 30 is in an upward direction in channels 26. As pivoting boom 18 is moved to its rearward retracted position, plate 30 is forced into a higher position in channels 26 since it is resting on support members 22, which defines the vertical position of debris guard 28. As debris guard 28 is pushed backward flexible portion 40 may hang over a back portion of forestry vehicle 10. As boom 18 goes to a forward or extended position, plate 30 slides downward in channels 26 to effectively block the passage of any debris into channel 20.

In FIG. 2, plate 30 is shown in an elevated position for purposes of illustration and it will move downward by the weight of rigid portion 38 thus causing plate 30 to slide downward, perhaps out of view.

The pivotal sliding connection of debris guard 28 to pivoting boom 18 provides for effective reduction of the infusion of forestry related debris into channel 20. This advantageously reduces the debris which can cause hydraulic and electrical issues when the debris is gathered into a channel 20 and as pivoting boom 18 may catch the debris and force it into control mechanisms, having negative effects.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A forestry vehicle, comprising:
   a frame;
   a pivoting boom carried by said frame;
   a first structure carried by said frame, said first structure being positioned on a first side of said pivoting boom;
   a second structure carried by said frame, said second structure being positioned on a second side of said pivoting boom, a channel existing between said first structure and said second structure, said pivoting boom traveling in said channel as said boom pivots; and
   a debris guard pivotally and slidingly coupled to said boom, the debris guard including a structural member configured to slide along a face of said boom, a flap, and a pivoting member coupled to said flap and to said structural member.

2. The forestry vehicle of claim 1, wherein said first structure and said second structure each have at least one support member along said channel upon which said debris guard slides as said boom is pivoted.

3. The forestry vehicle of claim 1, wherein said debris guard includes angled edges for debris clearing.

4. The forestry vehicle of claim 2, wherein said structural member is a plate, said boom including two J-channels, said plate being slidingly disposed in said two J-channels.

5. The forestry vehicle of claim 4, wherein said two J-channels are at opposite edges of a face of said boom.

6. The forestry vehicle of claim 5, wherein said two J-channels face each other.

7. The forestry vehicle of claim 6, wherein said debris guard further includes
   at least one bracket attached to said plate, said bracket receiving said pivoting member.

8. The forestry vehicle of claim 7, wherein said flap includes:
   a rigid portion connected to said pivoting member; and
   a flexible portion connected to an end of said rigid portion opposite said pivoting member.

9. The forestry vehicle of claim 8, wherein said plate has debris clearing features along opposite sides of said plate, said debris clearing features being substantially located in said J-channels.

10. The forestry vehicle of claim 8, wherein the flexible portion hangs over a back portion of the forestry vehicle when the boom is retracted into the channel.

11. The forestry vehicle of claim 1, wherein said flap includes:
    a rigid portion connected to said pivoting member; and
    a flexible portion connected to and end of said rigid portion opposite said pivoting member.

12. A forestry vehicle, comprising:
    a frame;
    a pivoting boom carried by said frame;
    a cab carried by said frame, said cab being positioned on a first side of said pivoting boom;
    an engine assembly carried by said frame, said engine assembly being positioned on a second side of said pivoting boom, a channel existing between said cab and said engine assembly, said pivoting boom traveling in said channel as said boom pivots; and
    a debris guard pivotally and slidingly coupled to said boom, the debris guard including a plate configured to slide along a face of said boom, a flap, and a pivoting member coupled to said flap and to said plate, wherein the debris guard further includes at least one bracket attached to said plate, said bracket receiving said pivot member.

13. The forestry vehicle of claim 12, wherein the cab and the engine assembly each have at least one support member along said channel upon which said debris guard slides as said boom is pivoted.

14. The forestry vehicle of claim 13, wherein said boom includes two J-channels, said plate being slidingly disposed in said two J-channels.

15. The forestry vehicle of claim 14, wherein said two J-channels are at opposite edges of a face of said boom.

16. The forestry vehicle of claim 15, wherein said two J-channels face each other.

17. The forestry vehicle of claim 12, wherein said flap includes:
    a rigid portion connected to said pivoting member; and
    a flexible portion connected to an end of said rigid portion opposite said pivoting member.

18. The forestry vehicle of claim 17, wherein said plate has debris clearing features along opposite sides of said plate, said debris clearing features being substantially located in said J-channels.

* * * * *